United States Patent

Nozaki

[11] Patent Number: 6,012,760
[45] Date of Patent: Jan. 11, 2000

[54] WEATHER STRIP FOR VEHICLE

[75] Inventor: Masahiro Nozaki, Tsushima, Japan

[73] Assignee: Toyoda Gosei Co., Ltd., Nishikasugai-gun, Japan

[21] Appl. No.: 08/997,162

[22] Filed: Dec. 23, 1997

[30] Foreign Application Priority Data

Dec. 24, 1996 [JP] Japan .................................. 8-343785
Jul. 22, 1997 [JP] Japan .................................. 9-195502

[51] Int. Cl.$^7$ .................................. B60J 10/08; B60J 7/00
[52] U.S. Cl. .................................. 296/146.9; 296/206
[58] Field of Search .................................. 296/146.9, 206, 296/93, 96.21; 49/500.1

[56] References Cited

U.S. PATENT DOCUMENTS

| | | | |
|---|---|---|---|
| 4,884,370 | 12/1989 | Nozaki et al. | 49/479 |
| 4,894,954 | 1/1990 | Nozaki et al. | 49/479 |
| 4,918,867 | 4/1990 | Hayahi et al. | 49/490 |
| 4,986,947 | 1/1991 | Shigeki et al. | 264/250 |
| 5,035,937 | 7/1991 | Nozaki | 428/122 |
| 5,056,850 | 10/1991 | Katcherian et al. | 296/93 |
| 5,155,938 | 10/1992 | Nozaki | 49/441 |
| 5,195,274 | 3/1993 | Mishima et al. | 49/441 |
| 5,240,664 | 8/1993 | Hayashi et al. | 246/167 |
| 5,258,157 | 11/1993 | Nozaki et al. | 264/261 |
| 5,269,101 | 12/1993 | Nozaki et al. | 49/479.1 |
| 5,449,544 | 9/1995 | Ogawa et al. | 296/93 |
| 5,527,583 | 6/1996 | Nozaki et al. | 296/93 |
| 5,590,926 | 1/1997 | Nozaki | 296/206 |
| 5,636,895 | 6/1997 | Ito et al. | 296/146.9 |
| 5,797,644 | 8/1998 | Hamabata | 296/146.9 |
| 5,860,688 | 1/1999 | Biondo et al. | 296/93 |

FOREIGN PATENT DOCUMENTS

1-168346 11/1989 Japan .
2-26934 2/1990 Japan .

*Primary Examiner*—D. Glenn Dayoan
*Assistant Examiner*—Lori L. Coletta
*Attorney, Agent, or Firm*—Cushman Darby & Cushman, IP Group of Pillsbury Madison & Sutro LLP

[57] ABSTRACT

A weather strip is adhered to a vehicle by a double sided adhesive tape. The weather strip seals between the vehicle body and a door when the door is closed. The weather strip includes a first section extruded from a rubber material, which is vulcanized at a vulcanizing temperature. The weather strip also includes a second section molded from a thermoplastic elastomer at a temperature lower than the vulcanizing temperature. The adhesive tape is applied to the weather strip to span the first section and the second section. This permits a single piece of tape to be continuously applied to the weather strip, which is more efficient.

17 Claims, 6 Drawing Sheets

WEATHER STRIP FOR VEHICLE

BACKGROUND OF THE INVENTION

The present invention relates to a weather strip for vehicles. More particularly, the present invention pertains to a weather strip that is attached to a vehicle with double sided adhesive tape and includes a first section made of rubber and a second section made of thermoplastic elastomer.

Typically, vehicles have weather strips attached to the edges of doors, the periphery of a door opening of the vehicle body, window frames and the like. A weather strip seals the clearance between a component, such as a door, and the vehicle body. Linear portions of weather strips are generally formed by extrusion molding. On the other hand, curved portions that correspond to corners of doors and end portions of the weather strip are typically made of rubber material and are typically formed by injection molding using a metal mold (for example, Unexamined Utility Model Publication No. 1-168346 and Unexamined Utility Model Publication No. 2-26934). Generally, such a weather strip is attached to a vehicle by using a double sided adhesive tape made of resin.

Figure 11:
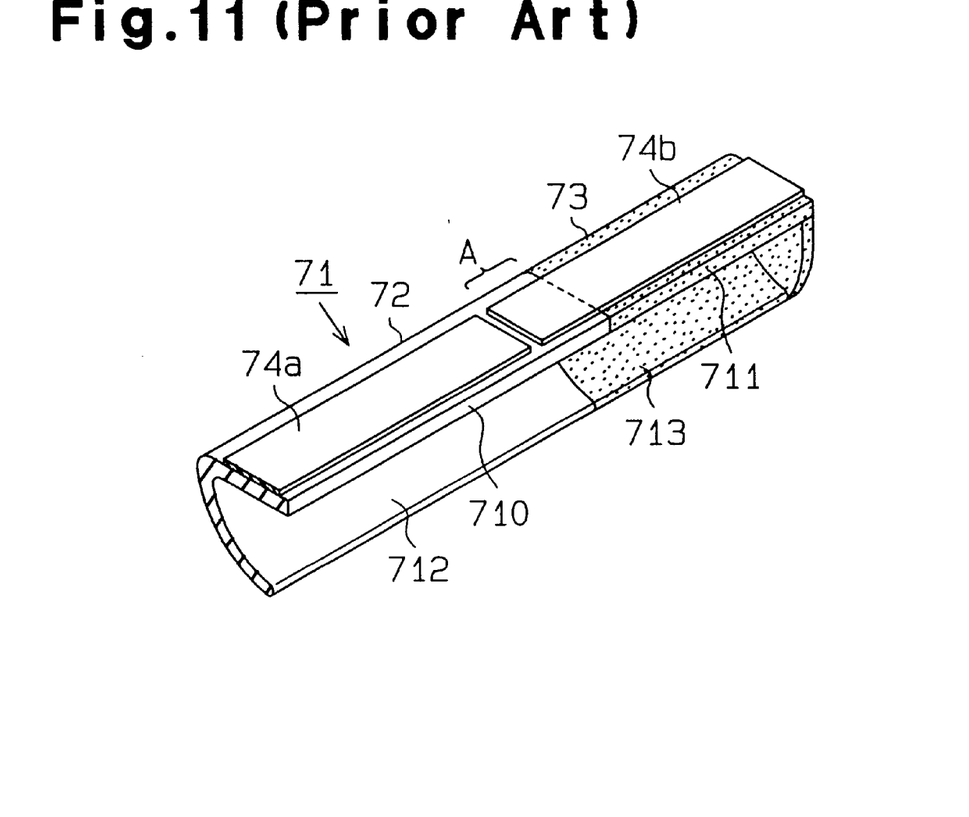
FIG. 11 is a partial perspective view illustrating a conventional type weather strip, which is attached to the front end of a vehicle hood door.

FIG. 11 is a perspective view illustrating a part of a weather strip 71 used a vehicle hood door. The weather strip 71 includes a linear first section 72 and a second section 73. The second section 73 functions as a curved portion and/or an end portion of the weather strip, which cannot be extruded. The first and second sections 72 and 73 include first and second bases 710, and 711 respectively. Double sided adhesive tapes 74a and 74b are attached to the top surface of the bases 710, 711. The weather strip 71 is bonded to the underside of the vehicle hood door by the tapes 74a, 74b.

Figure 12:
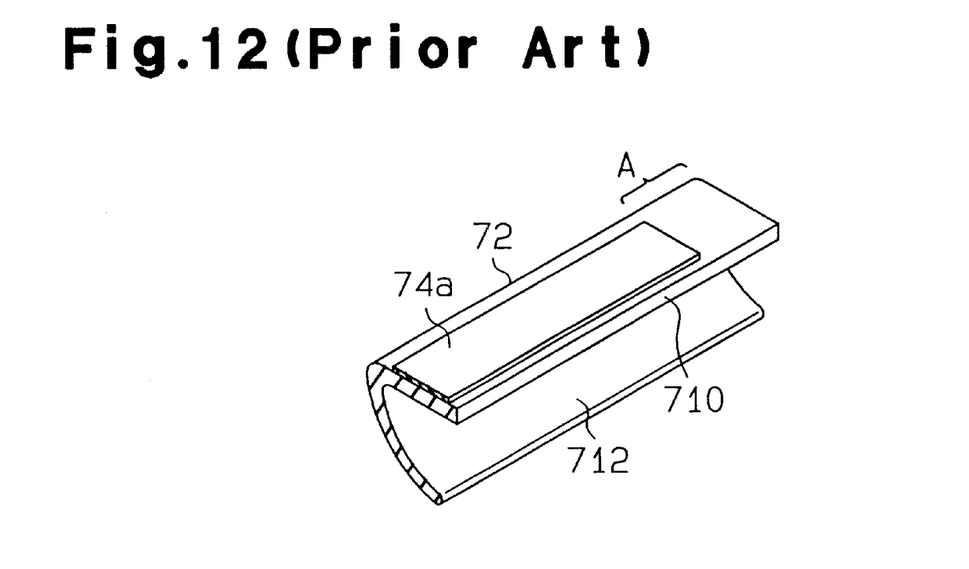
FIG. 12 is a partial perspective view illustrating a first section of the weather strip of FIG. 11 and a double sided adhesive tape adhered thereto.

The first double sided adhesive tape 74a is adhered to the top surface of the base 710 of the first section 72 except for at part A. The second double sided adhesive tape 74b is adhered to the entire top surface of the second section 73 and to the part A of the first section 72. When the hood door is shut, first and second seal lips 712 and 713 of the weather strip 71 contact the body side member of the vehicle near a front bumper and are flexed between the hood door and the body thereby sealing the inner space of the hood door.

When manufacturing the above described weather strip 71, ethylene-propylene-diene terpolymer (EPDM) solid rubber is extruded and vulcanized to form the first section 72. Thereafter, the double sided adhesive tape 74a is applied on the top surface except for the part A. The first section 72 is then fitted in a metal mold. The mold forms the second section 73, which is attached to the first section 72. The second section 73 is generally made of the same rubber material as the first section 72 (unvulcanized EPDM solid rubber).

The unvulcanized EPDM is injected into the metal mold, which is heated to 180 to 220° C., and vulcanized. The vulcanized EDPM is then cooled to form the weather strip 71, which includes the integrated first and second sections 72, 73. The double sided adhesive tape 74b is then adhered to the second section 73, which is located at the end of the weather strip 71.

The mold that forms second section 73 reaches high temperatures, because the second section 73 formed from rubber should be vulcanized. Therefore, if the resin adhesive tape 74a is attached to the part A, which is next to the second section 73, the tape segment 74a may be damaged or stick to the mold by the high temperature of the mold. Therefore the double sided adhesive tape segment 74a is not attached to the part A. Instead, after forming the second section 73, the tape segment 74b is attached to the part A as well as to the second section 73. This process requires two steps for applying the double sided adhesive tape segments (74a and 74b) on the weather strip 71. This complicates the manufacturing of the weather strip 71 and reduces the manufacturing efficiency.

Further, applying the tape segments 74a, 74b at different times may create a wide gap between the tapes 74a and 74b or cause the tape segments 74a and 74b to overlap each other.

SUMMARY OF THE INVENTION

Accordingly, it is an object of the present invention to provide a weather strip attached to a vehicle body with a double sided adhesive tape and is manufactured with improved efficiency.

A weather strip according to the present invention is mounted to a vehicle by means of a double sided adhesive tape. The weather strip seals between the body of the vehicle and a door of the vehicle when the door is closed. The weather strip includes a first section formed from a rubber material that is vulcanized at a predetermined temperature and a second section formed from a thermoplastic elastomer that is cooler than the predetermined temperature. The adhesive tape is applied to the weather strip to span the first section.

A method for producing the above described weather strip includes the following steps. That is, the method includes steps of forming a first section having a base and a seal section by extruding a rubber material, vulcanizing the first section at a predetermined temperature, removing part of the seal section from the first section to form a space, applying the adhesive tape to the base, and forming a second section within the space with a thermoplastic elastomer at a temperature lower than the predetermined temperature by injection molding.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4. A weather strip 4 of this embodiment is attached to the front end of a hood door 2, which covers the engine compartment of a vehicle.

Figure 2:
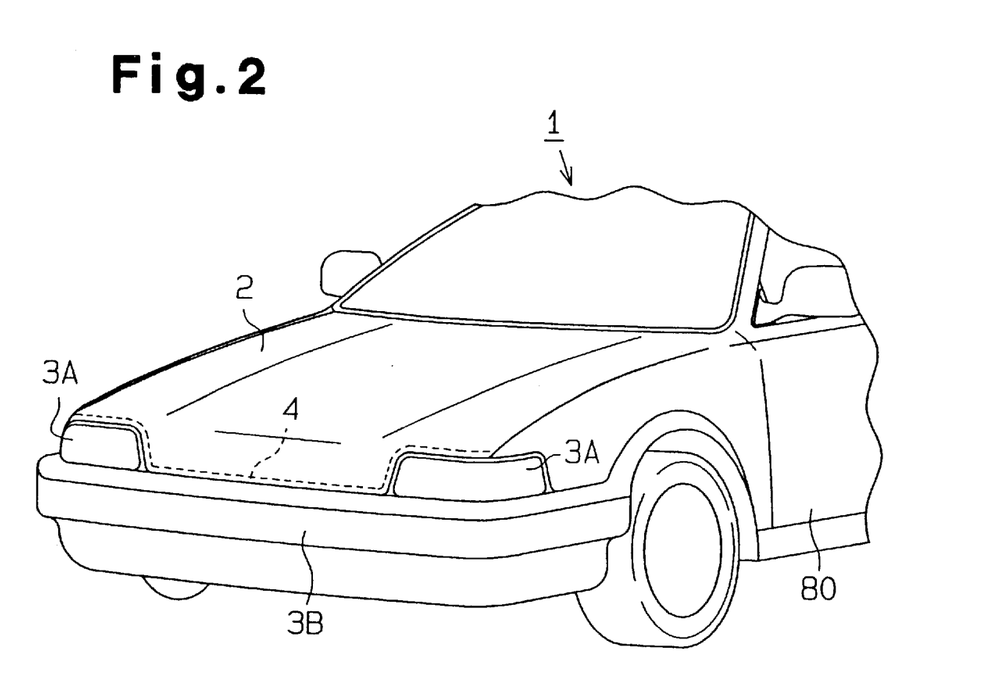
FIG. 2 is a partial perspective view illustrating the front portion of a vehicle.

As shown in FIG. 2, the front end of the hood door 2 is shaped to match a line defined by the headlights 3A and a front bumper 3B. A clearance between the hood door 2 and the vehicle body side member is sealed by the weather strip 4.

The weather strip 4 includes the first section 7 and a second section 8. The first section 7 is extruded by ethylene-propylene-diene terpolymer (EPDM), whereas the second section 8 (crosshatched part in FIG. 1) is formed by injection molding of thermoplastic elastomer (TPE). The TPE includes resin, such as polypropylene, and rubber. The first section 7 includes a base 7a, which is shaped like an elongated band, and a lip (seal portion) 7b. A top surface of the base 7a serves as a tape adhesion surface 5, and the lip 7b extends downward in an arcuate manner from the edge of the base 7a. After the extrusion and prior to the injection molding of the second section 8, part of the lip 7b is removed from a point that is a few centimeters from each end of the extrusion. Thus, each end of the extrusion has only the base 7a. A double sided adhesive tape 6 is attached to the tape adhesion surface 5, or the top surface of the base 7a. The tape 6 adheres the finished weather strip 4 to the underside of the hood door 2. The tape 6 includes an acrylic foam tape and adhesive applied on both sides of the acrylic foam tape. The melting point of the tape 6 is about 200° C.

Figure 1:
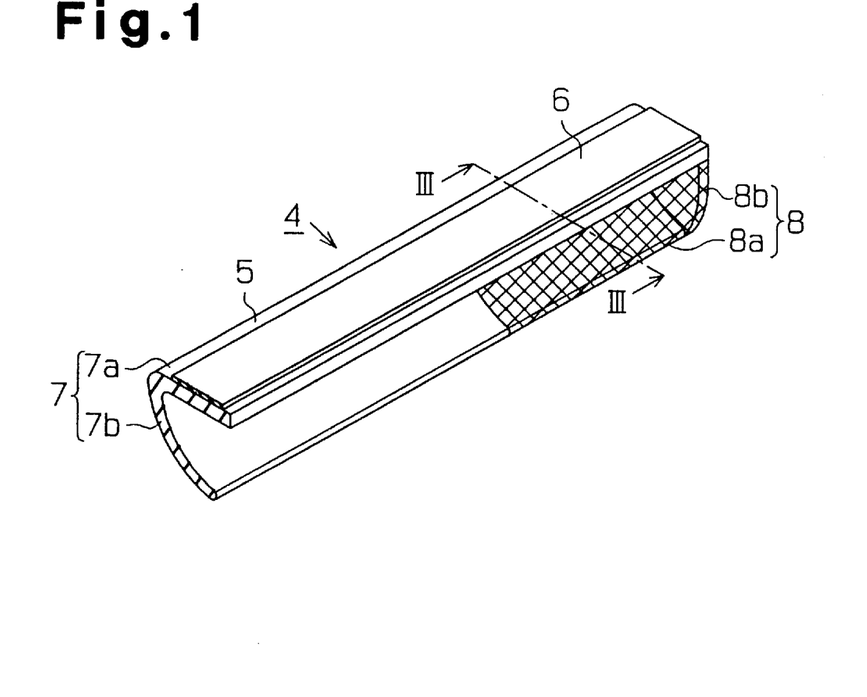
FIG. 1 is a partial perspective view illustrating a weather strip that is attached to a vehicle hood door.
Figure 3:
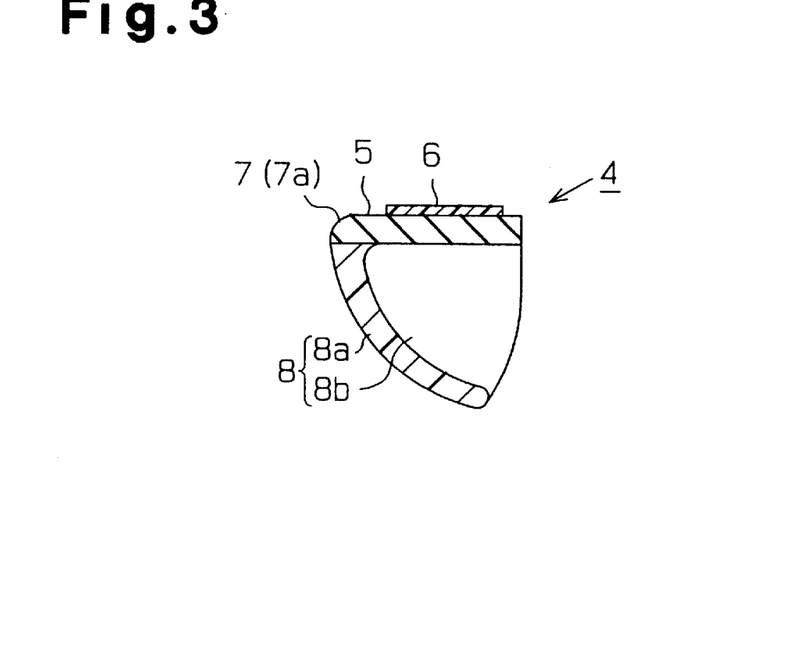
FIG. 3 is a cross-sectional view taken along line III—III of FIG. 1.

The second section 8 includes a lip 8a and a wall 8b. The lip 8a is attached to the base 7a of the first section 7, and the wall 8b defines the end of the weather strip 4. The lip 8a of the second section 8 has the same cross-sectional shape as the lip 7b of the first section 7. The lips 7b an 8a are continuous and integral.

The manufacturing process of the weather strip 4 will now be described. The apparatus used in the process is conventional (except for the details of the mold cavity) and is therefore not illustrated.

Initially, unvulcanized EPDM is extruded by an extruder to obtain an extruded EPDM material having a predetermined cross-section (the cross-section of the base 7a and the lip 7b). The extruded EPDM material is vulcanized by a vulcanizer and is then cooled. The double-sided adhesive tape 6 is continuously attached to the tape adhesion surface 5 of the weather strip 4 (the top surface of the base 7a of the first section 7). Consequently, an elongated EPDM extrusion (the first section 7 before cutting) with the double-sided adhesive tape 6 attached thereto is formed.

Figure 4:
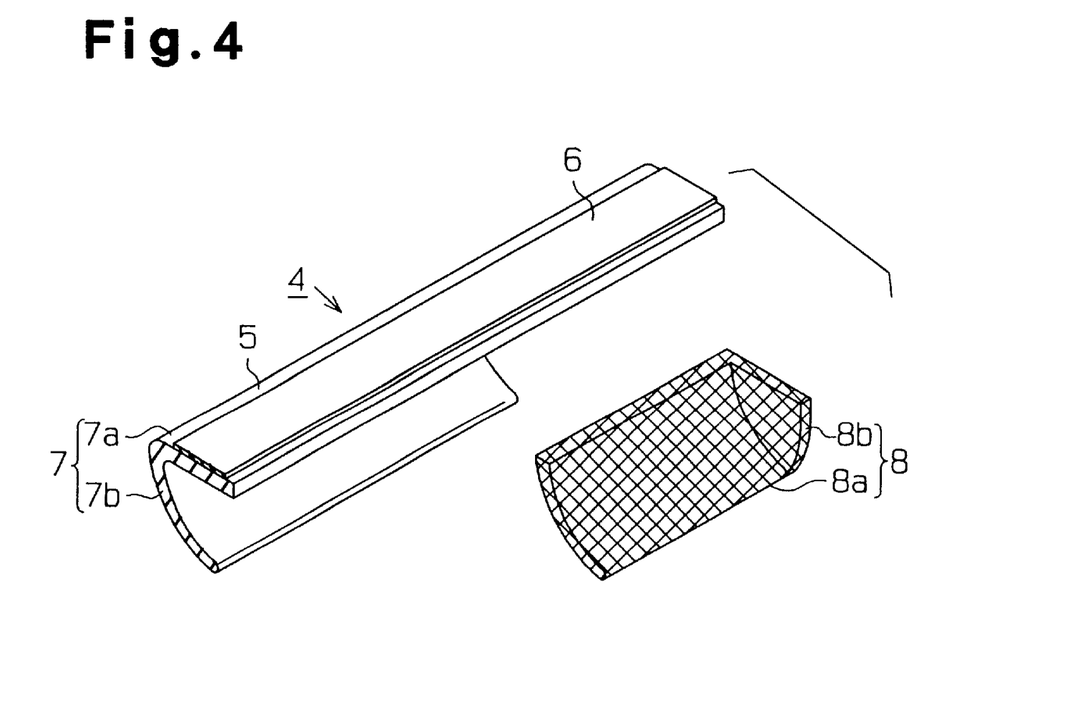
FIG. 4 is an exploded perspective view illustrating a first section and a second section of the weather strip of FIG. 1.

Thereafter, the elongated EPDM extrusion is cut to a predetermined length (the length of the front end of the hood door 2). Parts that are two to three-centimeters long are cut off from both ends of the lip 7b. As a result, the first section 7, one end of which is shown in FIG. 4, is obtained. The tape 6 may be attached to the first section 7 after the parts of the lip 7b are cut off.

Then, the first section 7 is fitted into a metal mold, in which cavities are defined. Molten thermoplastic elastomer (TPE) is injected into the cavities and is cooled. As a result, a final product, that is, the weather strip 4 (see FIG. 1) is manufactured. While the temperature of the molten TPE reaches a range approximately between 170° C. and 180° C., the temperature of the mold itself is kept in a relatively low temperature range between room temperature and 80° C. Therefore, although the tape 6 on the base 7a of the first section 7 may touch a part of the mold apparatus, the tape 6 is not deformed or damaged by the heat of the mold. Also, the tape 6 does not directly contact the molten TPE. Even if the tape 6 touches the molten TPE, the temperature of the TPE is lower than the melting point of the tape 6 and thus will not damage the tape 6.

When in use, the lips 7b and 8a of the first and second sections 7 and 8 are elastically flexed when contacting the body side member of the vehicle thereby filling the clearance between the hood door 2 and the vehicle body. As a result, the engine compartment of the vehicle is sealed from the outside.

The weather strip 4 has the following advantages.

(a) The tape 6 is attached to a single continuous surface of the base 7a of the first section 7. Therefore, application of the double sided adhesive tape does not require a plurality of steps. Also, the tape 6 does not need to be cut into segments and is attached to the weather strip 4 by a continuous single step. This improves the efficiency of the attachment of the tape 6 thereby shortening the manufacturing time of the weather strip 4.

(b) During injection molding, the second section 8, which is made of thermoplastic elastomer, is not vulcanized like the EPDM. Therefore, the second section 8 does not have to be heated to a high temperature range, for example, between 180° C. and 220° C. That is, forming the second section 8 requires only injection of thermoplastic elastomer into the mold, but no vulcanization. Further, the temperature of the mold is in a relatively low temperature range between room temperature and 80° C. The tape 6 is thus not damaged by excessive heat.

(c) The single length of double-sided adhesive tape 6 is continuously attached on the weather strip 4. Therefore, plural tape segments cannot overlap nor can they be separated by wide gaps, unlike a case in which two tape segments are attached to a weather strip.

(d) The base 7a remains whole without being divided, whereas the end portions of the lip 7b are cut and removed from the EPDM material. Therefore, the tape adhesion surface 5 (the top surface of the base strip 7a) remains continuous and undisturbed. The double sided tape 6 is preferably applied to the tape adhesion surface 5 right after the extrusion of the EPDM. This facilitates the application of the tape 6.

(e) The lip 7b of the first section 7 and the lip 8a and the wall 8b of the second section 8 completely seals the clearance at the front end of the hood door 2. The weather strip 4 therefore has an improved sealing performance.

A second embodiment of the present invention will now be described with reference to FIGS. 5 and 6. The weather strip 11 of this embodiment is attached to a door 80 (see 10 FIG. 2).

Figure 5:
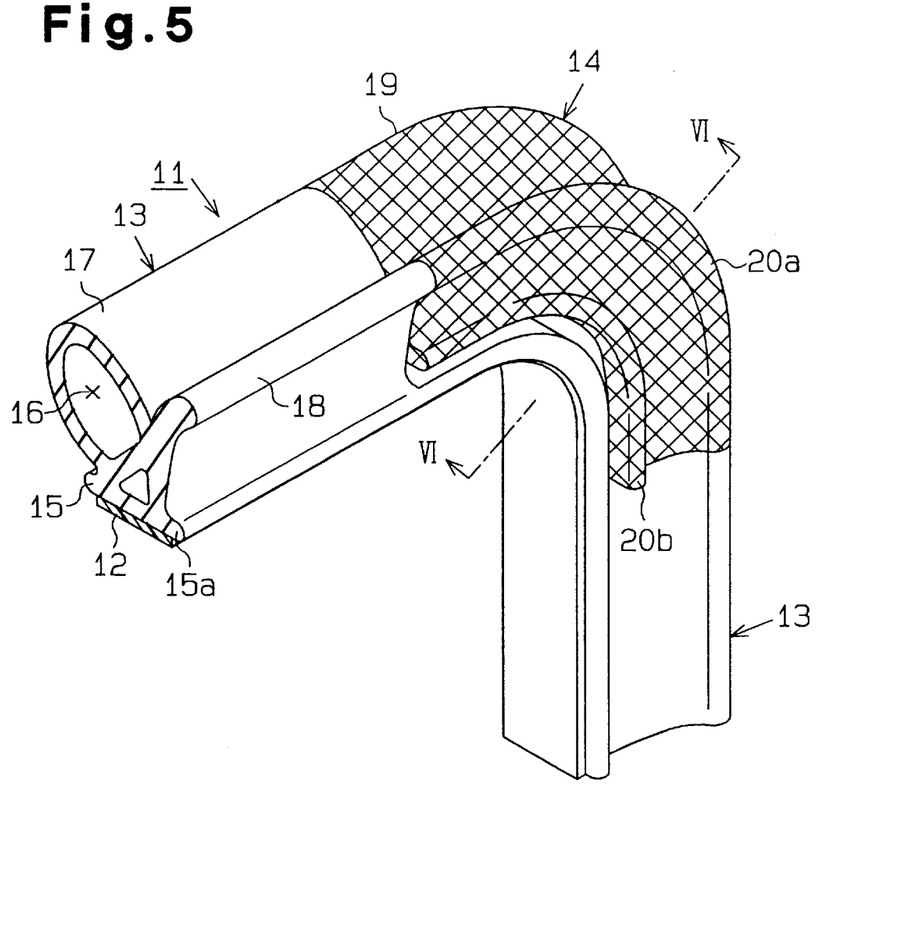
FIG. 5 is a partial perspective view illustrating a weather strip according to a second embodiment that is attached to a door of a vehicle.

As shown in FIG. 5, a double sided adhesive tape 12 is attached to an inner side of the door weather strip 11. The tape 12 adheres the weather strip 11 to the perimeter of the door 80. The door weather strip 11 includes a linear first section 13 and a second section 14 (crosshatched part in FIG. 5) that corresponds to a corner of the door 80. The first section 13 is formed by extrusion of EPDM, whereas the second section 14 is formed by injection molding of thermoplastic elastomer (TPE).

The first section 13 includes a base 15 and a seal having a hollow lip 17 and a solid lip 18. The base 15 is attached to the door 80, whereas the hollow lip 17 protrudes outward from the base 15 and has a hollow center 16. The double sided adhesive tape 12 is attached to the inner surface, or bottom surface, of the base 15.

The lips 17, 18 are cut off at locations corresponding to the corners of the door 80. As shown in FIG. 5, a horizontal portion of the first section 13 and a vertical portion of the first section 13 are connected only by a bottom strip 15a of the base 15.

Figure 6:
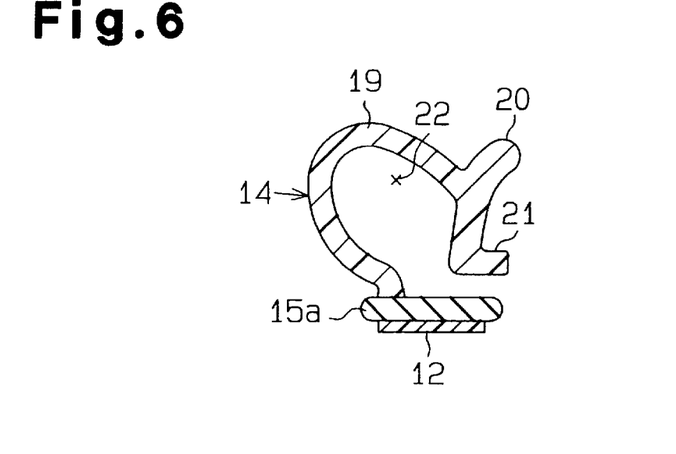
FIG. 6 is a cross-sectional view taken along line VI—VI of FIG. 5.

As shown in FIG. 6, the second section 14 includes a seal having a hollow lip 19 and a solid lip 20 formed outward of the bottom strip 15a of the base 15. The seal includes a lateral lip 21. The hollow lip 19 and the solid lip 20 have approximately the same cross-sectional shape as the hollow lip 17 and the solid lip 18, respectively, of the first section 13. However, a slot is defined between the lateral lip 21 and the bottom strip 15a of the base 15. The slot communicates a space 22 inside the hollow lip 19 with the outside. A core (not shown) used for molding the hollow lip 19 is removed from the slot after molding the hollow lip 19. The shape of the space 22 matches the shape of the core.

When manufacturing the door weather strip 11, unvulcanized EPDM is extruded by an extruder to obtain an extruded EPDM material having the cross-sectional shape of the first section 13. The extruded EPDM material is vulcanized by a vulcanizer and is then cooled. The double-sided adhesive tape 12 is continuously attached to the bottom strip 15a of the base 15. Consequently, an elongated EPDM extrusion (the first section 13 before cutting) with the double-sided adhesive tape 12 attached thereto is formed.

Thereafter, the EPDM material is cut such that its length matches the perimeter of the door 80. Parts of the lips 17, 18, which are ten to fifteen centimeters long, are cut off from locations corresponding to the corners of the door 80. As a result, the corner locations have only the bottom strip 15a of the base 15. The tape 12 may be attached to the first section 13 after the corner parts of the lips 17, 18 are cut off. In this manner, the first section 13 (a part excluding the cross-hatched part in FIG. 5) is obtained.

Then, the first section 13 is bent at the corner locations to match the curve of the door. The bent first section 13 is fitted into a metal mold, in which a cavity is defined. Molten thermoplastic elastomer (TPE) is injected into the cavity and is cooled. As a result, a final product, that is, the door weather strip 11 (see FIG. 5) is manufactured. The temperature of the molten TPE reaches a range approximately between 170° C. and 180° C. However, the temperature of the metal mold is kept in a relatively low temperature range between room temperature and 80° C.

When the door 80 closes the door opening of the vehicle boy, the lips 17 and 19 of the door weather strip 11 contact the vehicle body. This flexes the lips 17, 19 thereby sealing the clearance between the door 80 and the vehicle body.

The door weather strip 11 has the same advantages as the first embodiment. That is, the double sided adhesive tape 12 is continuously applied to the door weather strip 11. This facilitates the application of the tape 12. The second section 14, which is molded after the first section 13 is extruded, is made of thermoplastic elastomer. Thus, the tape 12 is not damaged by excessive heat.

In addition to the above advantages, the second embodiment has the following advantages.

(a) The hollow lip 19 of the second section 14 includes the lateral lip 21. When the door 80 is shut, the lateral lip 21 contacts the bottom strip 15a thereby preventing rain from entering the space 22.

(b) The corner portion of the door weather strip 11 is formed by injection molding. Bending the door weather strip 11 to fit the door 80 thus does not affect the cross-sectional shape of the lips 17, 18. This improves the sealing performance of the door weather strip 11.

Figure 7:
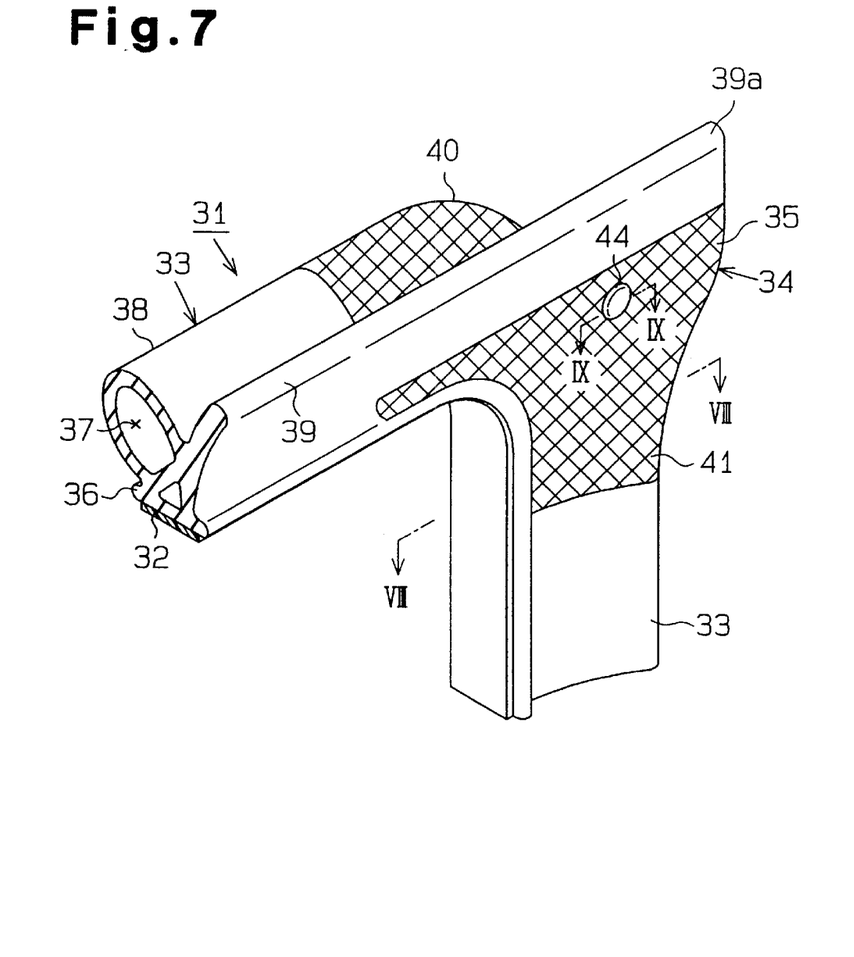
FIG. 7 is a partial perspective view illustrating a weather strip according to a third embodiment that is attached to a door of a vehicle.

A third embodiment of the present invention will now be described with reference to FIGS. 7 to 9. As shown in FIG. 7, a double sided adhesive tape 32 is attached on the inner side of a door weather strip 31. The tape 32 adheres the door weather strip 31 to the door of a front door of a four-door type vehicle. The weather strip 31 includes a linear first section 33 and a second section 34 (the cross-hatched portion in FIG. 7). The shape of the second section 34 corresponds to the shape of the corner of the door.

A support 35 is formed on the corner of the door weather strip 31. The support 35 is fixed to the door by a resin clip 44. The first section 33 is formed by extrusion of EPDM, whereas the second section 34 is formed by injection molding of thermoplastic elastomer (TPE).

The first section 33 includes a base 36 and a seal formed by a first hollow lip 38 and a first solid lip 39. The base 36 is attached to the door, whereas the first hollow lip 38, and first solid lip 39 protrude outward from the base 36 and include a hollow center 37. The double sided adhesive tape 32 is attached to the inner surface of the base 36. A part of the first hollow lip 38, and first solid lip 39 except an elongated lip portion 39a are cut off at locations corresponding to the corners of the door. Therefore, the corner locations have only a bottom strip 36a of the base 36. The remaining elongated lip portion 39a of the first solid lip 39 extends to the end of the support 35 as shown in FIG. 7.

Figure 8:
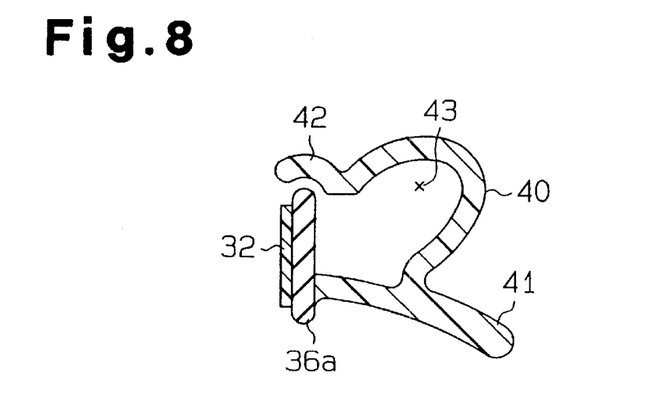
FIG. 8 is a cross-sectional view taken along line VIII—VIII of FIG. 7.

As shown in FIG. 8, the second section 34 includes a seal formed outward of the bottom strip 36a of the base 36. The seal includes a second hollow lip 40, a second solid lip 41 and a lateral lip 42. The second hollow lip 40 and the second solid lip 41 have approximately the same cross-sectional shape as the first hollow lip 38 and the first solid lip 39, respectively, of the first section 33. Also, a slot exists between the lateral lip 42 and the bottom strip 36a of the base 36. The slot communicates the space 43 inside the second hollow lip 40 with the outside. The solid lip 41 is integrally formed with the support 35 as shown in FIG. 7.

Figure 9:
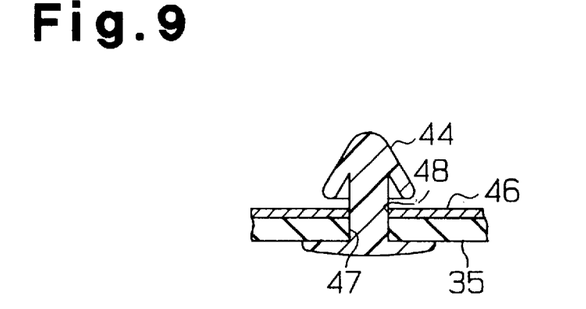
FIG. 9 is a cross-sectional view taken along line IX—IX of FIG. 7.

Further, as shown in FIG. 9, first and second holes 47 and 48 respectively are formed in the support 35 of the second section 34 and a door 46 and are aligned with each other. The clip 44 is fitted in the aligned holes 47 and 48. The door weather strip 31 is attached to the door 46 by the clip 44 and the adhesive tape 32. Additionally, a double sided adhesive tape may be located between the support 35 and the door 46 to adhere the support 35 to the door 46. Further, the resin clip 44 may be embedded, or insert molded, in the second section 34 by placing the clip 44 in the mold during the injection molding of the second section 34.

When manufacturing the door weather strip 31, unvulcanized EPDM is extruded by an extruder to obtain an extruded EPDM material having the cross-sectional shape of the first section 33. The extruded EPDM material is vulcanized by a vulcanizer and is then cooled. The double-sided adhesive tape 32 is continuously attached to the inner surface of the bottom strip 36a of the base 36. Consequently, an elongated EPDM material (the first section 33 before cutting) with the double-sided adhesive tape 32 attached thereto is formed.

The EPDM material is then cut such that its length matches the size of perimeter of the door 46. A part of the first hollow lip 38, and first solid lip 39, which are preferably ten to fifteen centimeters long are cut off from locations corresponding to the corners of the door. As a result, the corner locations have only the bottom strip 36a of the base 36. At this time, most of the first solid lip 39 is not removed such that it functions as the elongated seal lip 39a. The tape 32 may be attached to the first section 33 after the corner locations are cut. In this manner, the first section 33 (a part excluding the cross-hatched part in FIG. 7) is obtained.

Thereafter, the first section 33 is fitted into the metal mold, in which a cavity is defined. Molten thermoplastic elastomer (TPE) is injected into the cavity and is cooled. As a result, a final product, that is, the weather strip 31 (see FIG. 7) is manufactured. The temperature of the molten TPE reaches a range approximately between 170° C. to 180° C. However, the temperature of the mold, into which the molten TPE is injected, is kept in a relatively low temperature range between room temperature and 80° C.

When the door 46 closes the door opening of the vehicle body, the lips 38 and 40 of the door weather strip 31 contact the vehicle body. This flexes the lips 38, 40 thereby sealing the clearance between the door 46 and the vehicle body.

The weather strip 31 has the same advantages as the first and second embodiments. That is, the double sided adhesive tape 32 is continuously applied on the door weather strip 31. This facilitates the application of the tape 32. The second section 34, which is formed after the first section 33 is formed, is made of thermoplastic elastomer (TPE). Thus, the tape 32 is not damaged by excessive heat.

In addition to the above advantages, the third embodiment has the following advantages.

(a) The seal of the second section 34 includes the lateral lip 42. When the door 46 is shut, the lateral lip 42 contacts the bottom strip 36a thereby preventing rain from entering the space 43.

(b) The door weather strip 31 has the support 35 at its corner, and the support 35 is fixed to the door 46 by the clip 44. This prevents the door weather strip 31 from being misaligned with the door 46 thereby improving the sealing performance of the weather strip 31.

Figure 10:
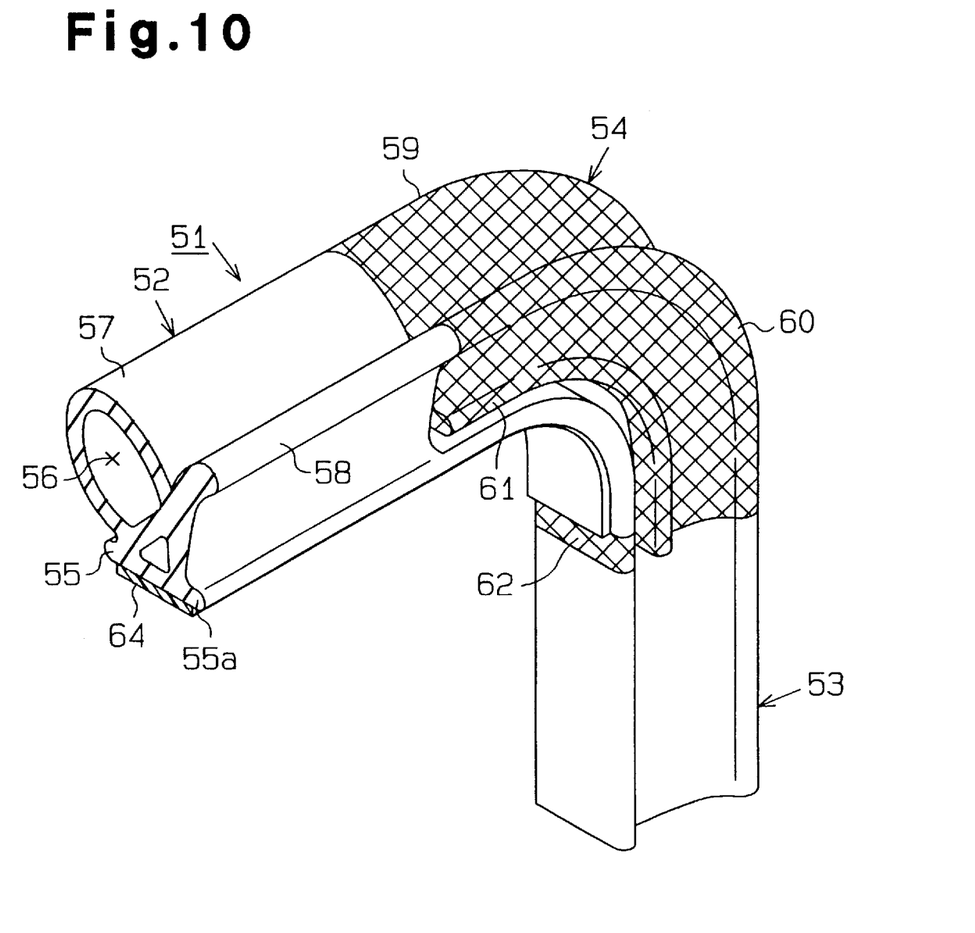
FIG. 10 is a partial perspective view illustrating a weather strip according to a fourth embodiment that is attached to a door of a vehicle.

A fourth embodiment of the present invention will now be described with reference to FIG. 10. A door weather strip of this embodiment is also attached to the door 80. FIG. 10 illustrates a corner of the door weather strip that corresponds to a top corner of the door 80.

As shown in FIG. 10, the door weather strip 51 includes a horizontal first section 52, a vertical first section 53 and a second section 54 (a cross-hatched part in FIG. 10). The second section 54 is located at a corner of the door and connects the horizontal and vertical first sections 52, 53 with each other. The first sections 52, 53 include a base 55 and a seal includes a hollow lip 57 having a center space 56 and projects outward from the base 55. The seal also includes a solid lip 58.

The base 55 of the horizontal first section 52 extends along the upper linear portion and the corner of the door weather strip 51. A double sided adhesive tape 64 is attached to an inner surface of a bottom strip 55a of the base 55. The tape 64 adheres the first section 52, which includes the corner of the weather strip 51, to the door 80. The vertical first section 53 is fixed to the door with a fastener (not shown) such as resin clips or a double sided adhesive tape. The first sections 52 and 53 are formed by extrusion of EPDM, whereas the second section 54 is formed by injection molding of thermoplastic elastomer (TPE).

A part of the lip 57, 58 of the first section 52 is cut off at the corner, which corresponds to the corner of the door 80. An end of the second section 54 is coupled to the end of the remaining lip 57, 58. The lower end of the second section 54 is coupled to the top end of the vertical first section 53. Therefore, the second section 54 has a main section that includes a hollow lip 59, a solid lip 60, a lateral lip 61 and a sub section that includes a base 62. The main par t has the same cross-sectional shape as the second section 14 of the second embodiment, whereas the sub part has the same cross-sectional shape as the vertical first section 53.

When manufacturing the door weather strip 51, unvulcanized EPDM is extruded by an extruder to form two extruded EPDM pieces having the cross-sectional shape of the horizontal and vertical first sections 52, 53. The extruded EPDM materials are vulcanized by a vulcanizer a nd then are cooled. A double-sided adhesive tape 64 is continuously attached to the inner surface of the bottom strip 55a of the base 55 of the horizontal first section 52. Consequently, an elongated EPDM extrusion (the horizontal first section 52 before cutting) with the double-sided adhesive tape 64 attached thereon is formed.

The EPDM extrusions are the n cut such that their lengths match the door 80. A part of the lip 57, 58, which is preferably ten to fifteen centimeters long, is cut off from an end portion of the horizontal first section 52. This end portion corresponds to the corner of the door weather strip 51. As a result, a part of the first section 52, which corresponds to the corner of the door 80, only has the bottom strip 55a of the base 55. The tape 64 may be attached to the first section 52 after the corner is cut. In this manner, the first sections 52,53 (the parts excluding the cross-hatched part in FIG. 10) are obtained. A plurality of resin clips (not shown) are located on the vertical first section 53 with a predetermined distance between each pair of adjacent clips for securing the vertical section 53.

Thereafter, the first sections 52, 53 are fitted into a metal mold, in which a cavity is defined. At this time, the bottom strip 55a of the base 55 is curved to match the shape of the corner of the door. Molten thermoplastic elastomer (TPE) is injected into the cavity and is cooled. As a result, a final product, that is, the door weather strip 51 (see FIG. 10) is manufactured. The temperature of the molten TPE reaches a range approximately between 170° C. to 180° C. However, the temperature of the mold, into which the molten TPE is injected, is kept in a relatively low temperature range between room temperature and 80° C.

When the door 80 closes, the lips 57, 58, 59 and 60 of the door weather strip 51 contact the vehicle body. This flexes the lips 57, 59 thereby sealing the clearance between the door and the vehicle body.

The door weather strip 51 has the same advantages as the second embodiment. That is, the double sided adhesive tape 64 is continuously applied not only on the horizontal section but also on the corner portion of the weather strip 51. This facilitates the application of the tape 64. The second section 54, which is formed after the first section 52 is formed, is made of thermoplastic elastomer (TPE). Thus, the tape 64 is not damaged by excessive heat.

Further, the vertical first section 53 is fixed to the door not by the double-sided adhesive tape 64 but by the fastener clips. This reduces the amount of double-sided adhesive tape 64 required for manufacturing the door weather strip 51 thereby reducing the manufacturing cost.

It should be apparent to those skilled in the art that the present invention may be embodied in many other specific forms without departing from the spirit or scope of the invention. Particularly, it should be understood that the invention may be embodied in the following forms.

(1) In the above embodiments, the first sections are made of rubber of a single type. However, the first sections may include a plurality kinds of rubber. For example, the base may be made of EPDM solid rubber and the seal may be made of EPDM sponge rubber. The material for forming the first section is not limited to EPDM, but the first section may be made of any rubber-like elastic material (for example, TPE, soft PVC).

(2) In the first to fourth embodiments, the first section is formed by extrusion and is trimmed to a predetermined length. Then, the part corresponding to the second section is removed. However, the part corresponding to the second section (cross-hatched part in FIGS. 1, 5 and 7) may be formed during the extrusion of the first section. In this case, an extruder having a variable shape die is used to form the first section and to define the part corresponding to the second section.

(3) In the third embodiment, the support 35 is fixed to the door with the clip 44. However, the clip may be integrally formed with the second section 34 by injection molding of TPE. In this case, the support 35 is secured to the door with the clip, which is integrally formed with the second section 34.

(4) The weather strips of the three embodiments may be attached to either the door of the door frame.

Therefore, the present examples and embodiments are to be considered as illustrative and not restrictive and the invention is not to be limited to the details given herein, but may be modified within the scope and equivalence of the appended claims.

What is claimed is:

1. A weather strip mounted to a vehicle by means of a double sided adhesive tape, wherein the weather strip seals between a body of the vehicle and a door of the vehicle when the door is closed, the weather strip comprising:

a first section formed by extrusion molding, the first section including a base mounted to the vehicle by the adhesive tape, and a seal for making contact with a part of the vehicle when the door is closed, wherein the first section is formed from a rubber material that is vulcanized at a predetermined temperature, wherein the adhesive tape is applied to the weather strip to extend along substantially the entire length of said base; and a second section formed from a thermoplastic elastomer by injection molding, the second section being (i) integrally joined to said base and the seal of the first section, and (ii) disposed on an opposite side of said base from the adhesive tape, wherein the second section is molded into a space that is made by cutting away a portion of the seal of the first section, wherein the second section is molded by thermoplastic elastomer injection molding at a temperature lower than the vulcanized temperature.

2. The weather strip according to claim 1 further comprising a corner portion that is shaped to correspond with a corner of the door, wherein the second section is formed at the corner portion.

3. The weather strip according to claim 1, wherein the base of the first section is a generally flat strip of material, wherein the seal is formed along and extends integrally from an edge of the base.

4. The weather strip according to claim 2, wherein the first section includes:

a horizontal portion having a generally horizontally extending seal;

a vertical portion having a generally vertically extending seal;

wherein the base is common to the horizontal and vertical portions; and wherein the second section joins the vertically and horizontally extending seals to one another.

5. The weather strip according to claim 4 further comprising a fastener for fastening the corner portion to the vehicle.

6. The weather strip according to claim 5, wherein the fastener includes a clip for fixing the weather strip to the vehicle.

7. The weather strip according to claim 2, wherein the first section includes:

a horizontal portion having a generally horizontally extending seal;

a vertical portion having a generally vertically extending seal;

wherein the corner portion connects the horizontal and vertical portions;

wherein the base of the first section is common to the horizontal portion and the corner portion; and wherein the second section joins the vertically and horizontally extending seals to one another and joins the base of the first section to the second section.

8. The weather strip according to claim 1, wherein the vulcanizing temperature of the rubber material is in the range of about 180° C. to about 220° C., the melting point of the adhesive tape is about 200° C. and the melting point of the thermoplastic elastomer is in the range of about 170° C. to about 180° C.

9. The weather strip according to claim 1, wherein the rubber material includes a ethylene-propylene-diene terpolymer and the thermoplastic elastomer includes a mixture of a resin moiety including a polypropylene and a rubber moiety.

10. A weather strip mounted to a vehicle by means of a double sided adhesive tape, wherein the weather strip seals between a body of the vehicle and a door of the vehicle when the door is closed, the weather strip comprising:

a first section formed from a rubber material that is vulcanized at a predetermined temperature, the first section including a base having a substantially flat shape, wherein a seal section is formed integrally with the base; and a second section formed from a thermoplastic elastomer that is cooler than the vulcanized temperature, the second section being bonded integrally with the base of the first section;

wherein the adhesive tape is applied to the weather strip to span the first section wherein the vulcanizing temperature of the rubber material is in the range of a bout 180° C. to about 220° C., the melting point of the adhesive tape is about 200° C. and the melting point of the thermoplastic elastomer is in the range of about 170° C. to about 180° C.; and wherein the rubber material includes a ethylene-propylene-diene terpolymer and the thermoplastic elastomer includes a mixture of a resin moiety including a polypropylene and a rubber moiety.

11. The weather strip according to claim 10 further comprising an end, wherein the second section is formed at the end.

12. The weather strip according to claim 10 further comprising a corner portion that is shaped to correspond with a corner of the door, wherein the second section is formed at the corner portion.

13. The weather strip according to claim 12, wherein the first section has a horizontal portion and a vertical portion, the horizontal portion extending generally horizontally and linearly, wherein the horizontal portion has a horizontally extending seal;

the vertical portion extending generally vertically and linearly, wherein the vertical portion has a vertically extending seal;

wherein the base is common to the horizontal and vertical portions; and wherein the second section connects the horizontally and vertically extending seals to one another.

14. The weather strip according to claim 13 further comprising a fastener for fastening the corner portion to the vehicle.

15. A method for producing a weather strip mounted to a vehicle by a double sided adhesive tape, wherein the weather strip seals between a door and a body of the vehicle when the door is closed, the method comprising the steps of:

forming a first section having a base and a seal section by extrusion molding;

vulcanizing the first section at a predetermined temperature after the step of forming the first section, wherein the first section is formed from a rubber material;

removing part of the seal section from the first section to form a space;

applying the adhesive tape to the base to span the first section;

forming a second section within the space with a thermoplastic elastomer by injection molding, and wherein the second section is formed at a temperature lower than the predetermined temperature.

16. A weather strip mounted to a vehicle by means of a double sided adhesive tape, wherein the weather strip seals between a body of the vehicle and a door of the vehicle when the door is closed, the weather strip comprising:

a first section formed by extrusion molding, the first section including a base mounted to the vehicle by the adhesive tape, and wherein the adhesive tape extends along substantially the entire length of said base; and a second section formed from a thermoplastic elastomer by injection molding, the second section being integrally joined to the first section and said base.

17. A weather strip mounted to a vehicle by means of a double sided adhesive tape, wherein the weather strip seals between a body of the vehicle and a door of the vehicle when the door is closed, the weather strip comprising:

a first section formed by extrusion molding, the first section including a base mounted to the vehicle by the adhesive tape, and a seal for making contact with a part of the vehicle when the door is closed, wherein the first section is formed from a rubber material that is vulcanized at a predetermined temperature, wherein the adhesive tape is applied to the weather strip to extend along substantially the entire length of the base; and a second section formed from a thermoplastic elastomer by injection molding, the second section being integrally joined to the base and the seal of the first section, wherein the second section is molded into a space that is made by cutting away a portion of the seal of the first section, wherein the second section is molded by thermoplastic elastomer injection molding at a temperature lower than the vulcanized temperature;

wherein the vulcanizing temperature of the rubber material is in the range of about 180° C. to about 220° C., the melting point of the adhesive tape is about 200° C. and the melting point of the thermoplastic elastomer is in the range of about 170° C. to about 180° C.; and wherein the rubber material includes a ethylene-propylene-diene terpolymer and the thermoplastic elastomer includes a mixture of a resin moiety including a polypropylene and a rubber moiety.

* * * * *